United States Patent [19]
Tamaki et al.

[11] 3,710,805
[45] Jan. 16, 1973

[54] PROCESS FOR PRODUCING MATERIAL FOR SMOKING

[75] Inventors: Einosuke Tamaki; Masao Kobari, both of Tokyo; Fumihiro Miyanowaki; Kunio Kato, both of Yokohama; Ko Nishida; Yukio Shimizu, both of Tokyo, all of Japan

[73] Assignee: The Japan Monopoly Corporation, Tokyo, Japan

[22] Filed: Sept. 14, 1971

[21] Appl. No.: 180,353

[30] Foreign Application Priority Data

Nov. 4, 1970 Japan..................................45/96453

[52] U.S. Cl....................................131/140 C, 47/58
[51] Int. Cl. ......................A01g 31/00, A24b 3/14
[58] Field of Search................47/58; 131/140, 140 C

[56] References Cited

UNITED STATES PATENTS

| | | | |
|---|---|---|---|
| 2,747,334 | 5/1956 | Routien et al. | 47/58 |
| 3,514,900 | 6/1970 | McDade | 47/58 |
| 3,628,287 | 12/1971 | Staba et al. | 47/58 |

*Primary Examiner*—Robert E. Bagwill
*Attorney*—Toren and McGeady

[57] ABSTRACT

A process is disclosed for producing sheet-like material for smoking which includes the steps of: culturing a fragment of a plant body of the genus Nicotiana in a liquid medium under aerobic conditions to derive tobacco cells suspended in the liquid, filtering the cultured broth containing the tobacco cells or the same mixed with fibrous materials and/or inorganic materials through a gauze of 50–120 mesh or filter cloth, so as to form a sheet-like cake having a thickness corresponding to dried weight above 50 g./m$^2$ and drying said sheet-like cake. Additionally, a process is disclosed for producing rod-like material for smoking which includes the steps of: culturing a fragment of a plant body of the genus Nicotiana in a liquid medium under aerobic conditions, to derive tobacco cells suspended in the liquid, separating the tobacco cells from the cultured broth, mixing the tobacco cells with tobacco leaf substances and/or fibrous materials and/or inorganic materials to form a paste with a moisture content of 80–93 percent, casting the paste into a rod-shape and freeze-drying said rod-shaped paste. The produce has excellent physical properties and the cigarettes made thereof have light and good organoleptic properties.

20 Claims, 2 Drawing Figures

PROCESS FOR PRODUCING MATERIAL FOR SMOKING

The present invention relates to a process for producing material for smoking using the tissue-culture of plants of the genus Nicotiana as raw materials.

The term "callus" in the present specification and claims refers to an amorphous lump of cells which have lost organ-forming capacity, which is formed when a fragment of the plant body is tissue-cultured on a solid medium, and which shows an external form resembling the agglutination tissue of the plant body. The term "tobacco cells" refers to a fine flocky dispersion of the cells formed when pieces of the said callus are further inoculated and tissue-cultured in a liquid medium under aerobic conditions. The liquid containing the tobacco cells is represented by the term "cell suspension" or "cultured broth."

Smoking tobacco has hitherto been produced by a process consisting of a long term cultivation step of a plant of the genus Nicotiana in the field and a complex operation step for cigarette-making using the harvested leaf of said plant. However, said cultivation step of the plant is completely at the mercy of land- and climatic-conditions, and therefore the kind, quantity, quality, and the like, of the tobacco leaf which is the main raw material of cigarettes have not necessarily been free from the influence of the above-mentioned natural conditions.

The plant body is generally composed of innumerable cells, which form the tissues and organs of the plant and perform living phenomena thereby. It was found lately that a complete plant body can be grown directly from any voluntarily taken-up cells of the plant body by so-called tissue-culturing of said cells, and such tissue-culture was applied for studies in the improvement of plant breeding by selecting cells having excellent plant genetic characteristics. Further it is known that so-called callus can be formed on a solid medium by means of such tissue-culture, while a suspension of fine cells of the plant can be obtained by tissue-culturing said callus in liquid medium under aerobic conditions.

We have investigated the above-mentioned tissue-culture of plants of genus Nicotiana, and found that the tobacco cells derived from the callus and propagated in cultured broth can be made readily into sheet-like or rod-like materials for smoking.

An object of the invention is to provide a simple and facile process for producing material for smoking.

Another object of the invention is to provide an industrial process for producing material for smoking, which is not influenced by land- and soil-conditions or climatic conditions.

Still another object of the invention is to provide a process for producing material for smoking containing little or no nicotine and having excellent physical and organoleptic properties.

Other objects of the invention will readily be understood from the following explanation.

Referring now to the drawings.

According to the present invention, the following plants of the various species belonging to genus Nicotiana may be used for tissue-culture:

cultural varieties such as *N. tabacum* var. *bright yellow*, *N. t.* var. *xanthi ova*, *N. t.* var. *burley 21*, *N. t.* var. *enshu*, *N. t.* var. *matsukawa*, *N. t.* var. *nanbu*, *N. t.* var. *shirodaruma*, *N. t.* var. *suifu*, *N. t. xanthi yaka*, *N. velutina*, *N. rustica*, and the like, and wild species such as *N. glutinosa*, *N. acuminata*, *N. affinis*, *N. amplexcaulis*, *N. arentsii*, *N. bigelovii*, *N. clevelandii*, *N. codifolia*, *N. debneyi*, *N. exclesior*, *N. fragrans*, *N. glauca*, *N. gossei*, *N. ingulba*, *N. knightiana N. langsdorfii*, *N. miersii*, *N. repanda*, *N. multivalvis*, *N. occidentalis* var. *obliqua*, *N. rosulata*, *N. occidentalis* var. *occi*, *N. pauciflora*, *N. quadrivalvis*, *N. raimondii*, *N. simlans*, *N. solanifolia*, *N. stenocarpa*, *N. sylvestris*, and the like.

These plants of genus Nicotiana have physiological properties more suitable for tissue-culture in comparison with other kinds of plant bodies, and many studies on tissue-culture using the plants of genus Nicotiana have hitherto been reported. Further, several suitable medium-compositions for tissue-culture have been mentioned in the literature, for example, so-called White's medium (1943), Heller's medium (1953), Murashige and Skoog's medium (1962) and Linsmaier and Skoog's medium (1965).

The said known media consist of inorganic substances and other minute elements which have hitherto been used in the medium for the water-culture method for plants, such as, saccharides, auxins (growth-promoting substance), cytokinins, vitamins and amino acids. In particular the following substances are used in these media:

inorganic salts such as potassium chloride, calcium chloride, potassium nitrate, calcium nitrate, sodium nitrate, ammonium nitrate, sodium sulfate, magnesium sulfate, potassium phosphate, sodium phosphate, ferric chloride, ferric sulfate, $Na_2$-EDTA ($Na_2$-Ethylenediamine tetra-acetic acid), manganese sulfate, zinc sulfate, boric acid, potassium iodide, copper sulfate, sodium molybdate, aluminum chloride and cobalt chloride, saccharides such as sucrose, glucose, fructose and mannose, auxins such as 2,4-dichlorophenoxy-acetic acid, α-naphthaleneacetic acid and indol3-acetic acid, cytokinins such as kinetin, vitamins such as thiamin hydrochloride, pyridoxin hydrochloride, nicotinic acid, myo-inositol and biotin, and amino acids such as glycine.

We have examined the compositions of said conventional media for tissue-culture and disclosed the following subjects:

1. The yield of tobacco cells in the tissue-cultures using the known media was highest when the Linsmaier and Skoog's medium was adopted.

Figure 1:
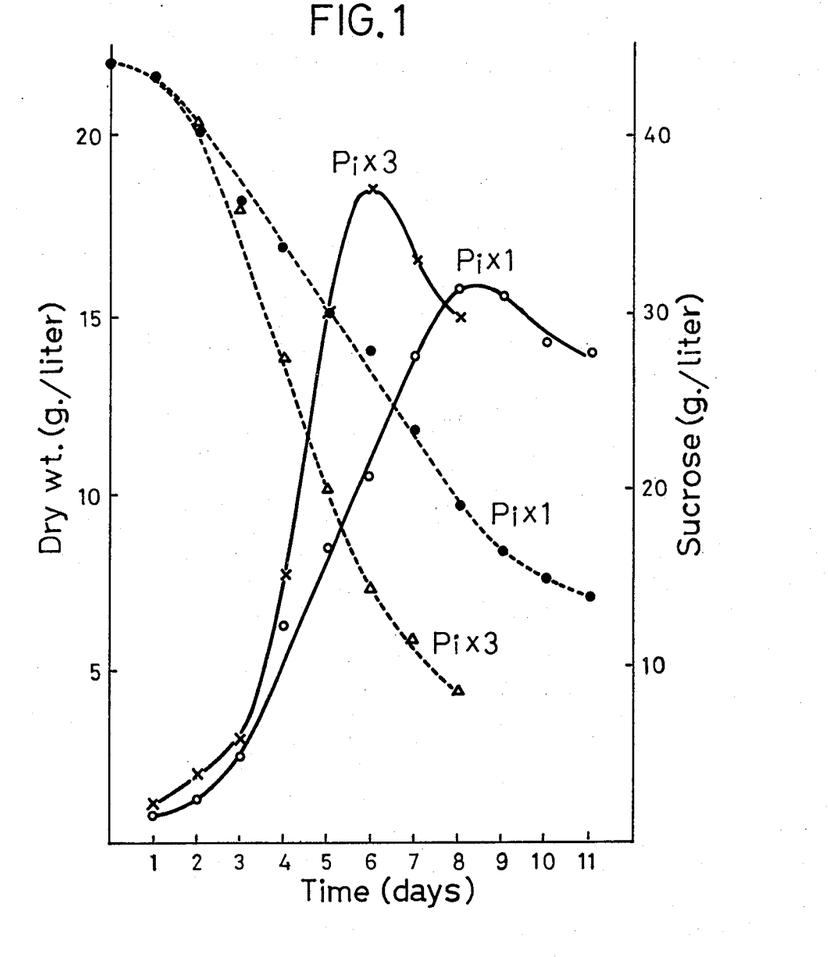
FIG. 1 is a graph showing the increase of formed tobacco cells and the decrease of remaining sugar in the cultured broth, with the lapse of time, when the cells of Nicotiana tabacum var. bright yellow are tissue-cultured under aerobic condition, using liquid media in which the content of $KH_2PO_4$ is varied

2. It has a favorable effect on the yield of tobacco cells to use quantities of phosphate from twice to thrice as much as that of the Linsmaier and Skoog's medium which contains the largest quantity of phosphate among the said known media, i.e., 340–510 mg./liter, as shown in FIG. 1, where the solid-line designated with PiX3 is the curve indicating the dried weight of tobacco cells formed when a quantity of phosphate thrice as much as that of the medium was used, and the solid-line designated with PiX1 is the similar curve when a quantity of phosphate equal to that of the medium was used, while the dotted-lines with the same designations are the curves of remaining sugar in the cultured broth corresponding to said solid-lines, respectively.

3. In the Linsmaier and Skoog's medium, myo-inositol can be replaced with thiamin hydrochloride.

From the above, an example of the suitable medium for tissue-culture used in the process of the invention is shown below:

TABLE 1

| | |
|---|---|
| $NH_4NO_3$ | 1,650 mg./liter |
| $KNO_3$ | 1,900 " |
| $CaCl_2 \cdot 2H_2O$ | 440 " |
| $MgSO_4 \cdot 7H_2O$ | 370 " |
| $KH_2PO_4$ | 340 " |
| $Na_2$-EDTA | 37.3 " |
| $FeSO_4 \cdot 7H_2O$ | 27.8 " |
| $H_3BO_4$ | 6.2 " |
| $MnSO_4 \cdot 4H_2O$ | 22.3 " |
| $ZnSO_4 \cdot 4H_2O$ | 8.6 " |
| KI | 0.83 " |
| $Na_2MoO_4 \cdot 2H_2O$ | 0.25 " |
| $CuSO_4 \cdot 5H_2O$ | 0.025 " |
| $CoCl_2 \cdot 6H_2O$ | 0.025 " |
| Sucrose | 40,000 " |
| 2,4-dichlorophenoxy-acetic acid | 0.2 " |
| Thiamin hydrochloride | 1.0 " |
| Kinetin | 0.2 " |
| pH (after sterilization) | 5.0-6.2 |

As regards the use of the tissue-culture from the plant body of the genus Nicotiana in the present invention, for example, fragments of the leaf, stem, root, flower, seed or other organs or tissues of the plant are washed, surface-sterilized, placed on a sterile agar medium for tissue-culture which has a composition as described in Table 1 and is contained in an Erlenmeyer's flask plugged with cotton wool, and are incubated at 25°-35 °C. Said fragments of organs or tissues swell and callus is derived in 4-5 weeks.

Such callus can be gradually made purer by means of repeating the above solid medium-culturing, that is, by inoculating fresh solid medium in turn with small pieces of callus which have been cut off from callus formed in the previous solid medium-culturing.

The callus thus reformed and refined on the solid medium is then inoculated into a liquid medium having the same composition as that of the solid medium but without agar, and cultured on a shaker at a temperature of 25°-35° C for 2-3 weeks. The inoculum is about 3 g. of callus by fresh weight to 100 ml. of liquid medium, and the callus propagates in the culture liquid as a flocky suspension, that is, as "tobacco cells." These tobacco cells become finer and are more rapidly formed when the above shake-culture in liquid medium is repeated, inoculating fresh liquid medium in turn with a portion of the previously cultured broth containing tobacco cells.

The cell suspension obtained in the shake-culture is, after being scaled-up by turns as described above, inoculated into a liquid medium of the same composition set in a fermenter made of stainless steel, and cultured with aeration while being agitated gently. The inoculum is one tenth of the quantity of the whole medium, and intensive agitation is unfavorable as the membranes of tobacco cells maybe broken. The quantities of air required to aerate are about 0.5-2.0 liters/liter of medium/minute and the culturing period is within a week.

Tobacco cells, thus cultured and propagated in a large quantity by the aeration culture with stirring, can be separated from the cultured broth by filtration or centrifugation, without the cell membranes being broken. The separated tobacco cell collection contains 90-95 percent (W.B.) of moisture, and the yield of dried weight of these tobacco cells is 50-65 percent of the sugar consumed in the cultured broth and amounts to 15-20 g. per liter of the medium (in condition of using batchwise cultivation). The single cell constituting these tobacco cells is an ellipsoid having a longer diameter of about 50-200 $\mu$ and a shorter diameter of about 30-50 $\mu$.

In connection with the above explanation, it is observed that it takes at least 4-5 weeks of culture on agar medium, 2-3 weeks of liquid shake-culture and about a week of aeration-liquid culture with stirring, totaling to a long term of 7-9 weeks, to obtain tobacco cells as materials for smoking, and moreover such a total culture term is remarkably prolonged when both the solid medium- and liquid medium-culturings are repeated as described above. However, once a cultured broth where tobacco cells have been propagated in homogeneous suspension is obtained in the aeration-culture with stirring, additional cultured broth can be obtained within a short period by adopting a semi-continuous process, where a portion of the cultured broth is taken out to leave the other portion of said broth in the fermenter and fresh sterile medium is supplemented to the remaining broth so as to carry on the culturing of the tobacco cells again. For example, when about a half of the volume of the cultured broth is taken out from the fermenter and aeration-culture is carried on after supplying the fermenter with fresh medium, the subsequent logarithmic growth-phase of the tobacco cells in the culturing will be approximately completed within a day or two, and consequently about a half of the approximately finished cultured broth (containing tobacco cells of 13-15 g. by dried weight per liter) can be obtained everyday or every other day by employing the semi-continuous process. Furthermore, the cultured broth taken out from the fermenter as described above contains a relatively large quantity of remaining sugar, and consequently it is advantageous to return the filtrate of the taken-out cultured broth to the initial fermenter, after supplementing with fresh medium-constituents and sterilizing the same, so as to re-utilize the filtrate.

According to the present invention, firstly, the tobacco cells obtained by tissue-culture of the plants of genus Nicotiana are made into a sheet-like material for smoking. There have hitherto been several methods for producing the sheet-like materials for smoking, for example, extrusion, slurry, paper-making and microflaking. However, each of these conventional processes are composed of several complex steps.

Now we have discovered that sheet-like material for smoking having excellent physical and organoleptic properties can be obtained without any complex operation, by using tobacco cells as the major raw materials. That is, fresh tobacco cells having a specific type of of viscosity and consequently sheet-like material for smoking can be obtained by filtering the cultured broth containing such tobacco cells or the same mixed with the fibrous materials and/or inorganic substances to form a cake (filtration residue) and drying this cake as it is. The above process is carried out without using any of the binders and water-proofing agents which have been generally indispensable in the conventional processes for producing the sheet-like material.

According to the present invention, a cultured broth containing the tobacco cells, or the same mixed with the fibrous materials and/or inorganic materials which do not damage the smoking characteristics of the final products therefrom, are filtered through a gauze of 50–120 mesh or filter cloth, so as to form a filtration cake with a thickness corresponding to a dried weight above 50 g./m². If the dried weight/m² of the cake is below 50 g., the thickness of the cake will not be uniform which causes inconveniences in the subsequent treatments. It is desirable that the moisture content of the cake be reduced to below 95 percent (W.B.), by using a sucker-type filter. Such filtration by means of suction can be carried out within an extremely short time, and the rate of recovery of tobacco cells from the cultured broth is about 95–98 percent.

Suitable as the fibrous material to be mixed with the cultured broth in the present invention, are vegetable fiber such as wood pulp, hemp, bagasse, beet, and tobacco vein, and inorganic fiber such as glass fibers, and carbon fiber. Silica, alumina, asbestos, kieselguhr, talc, calcium carbonate and zeolite maybe used as the inorganic materials. These fibrous materials and inorganic materials are effective not only as a filter medium in the above filtration but also to improve the physical properties, especially the strength and filling value, of the sheet-like material made therefrom. The amount of the fibrous and inorganic materials to be mixed with the cultured broth are below 30 percent based on the dried weight of the tobacco cells contained therein.

In the present invention, tobacco powder, tobacco dust, vein (these will be represented by the term "tobacco leaf substances" hereafter in the specification and claims.), and/or the supplementary agents such as aromatics, burning agents, sweetenings, and hydroscopic agents, may be made to adhere to the above filtration cake by spreading the same thereon and pressing the cake gently between rolls, in the same way as in the conventional process for producing sheet-like materials for smoking. However, alternatively the aromatics, sweetenings and hydroscopic agents among said supplementary agents may be later incorporated into finished (dried) sheet-like material in the invention. As the aromatics described above, essential oils such as cascarilla oil, bergamot oil, iris oil, extracts such as benzoin tincture, tobacco extract, fruit extract, and perfumeries such as coumarin, vanillin, and menthol, may be used. Active carbon, sodium fumarate, potassium fumarate, and the like, maybe used as burning agents, while sucrose, glycerol, propyleneglycol, sorbitol, and the like, may be used as sweetenings or hydroscopic agents. The quantities of the tobacco leaf substances to be made to adhere to the cake are below the value of the dried weight of the tobacco cells contained in the cake. The quantities of the above supplementary agents to be added are rather small, and therefore addition of these agents have little influence on the moisture content of the cake.

The sheet-like cake thus obtained is dried at a temperature below 80° C or dried at a temperature of 100°–170° C after being pre-dried at a temperature below 80° C. The moisture content of the dried sheet is adjusted thereafter to 10–14 percent (at a temperature of 20° C and a humidity of 60 percent) in a manner. In the above drying at reduced temperatures or that with gradually increasing temperature, the membranes of the tobacco cells in the cake are not broken, and therefore a sheet-like material having excellent strength, water-proof property and filling capacity can be obtained.

Concerning the reason or mechanism of such improvements in physical properties in the products according to the invention, it is considered that pectin substance contained in the membranes of the tobacco cells exists in a so-called physiologically active state and acts as an excellent binder, and that said pectin substance combines with divalent cations such as calcium, magnesium, and the like, co-existing in said cake, to become water-insoluble on drying the cake.

Table 2 and 3 illustrate the comparisons of the physical and organoleptic properties of the sheet-like material, which is produced by using only the tobacco cells of the present invention, with those of sheet-like material produced in the conventional extrusion process using no tobacco cells.

Each test item of the physical properties of the sheet-like materials shown in Table 2 was measured in the following way:

Thickness (mm) was measured by a micrometer of the dial gauge type at a pressure of 550 g./cm².

Strength (g./mm²) was calculated by following the equation which consists of the above thickness (mm), the below mentioned width (mm) and the tensile load (g.) of the test piece, the tensile load having been measured in such a way that a test piece having a width of 15 mm and a length of 60–70 mm had been tensed (loaded) by using a tensile tester with constant rate until said test piece was cut.

$$\text{Strength} = [\text{Tensile load (g.)}]/[\text{Width (15 mm)} \times \text{Thickness (mm)}]$$

Elongation (%) was expressed as the percentage of the elongation, which was measured in the same operation as in the abovementioned measuring of tensile load, based on the length of the test piece not loaded.

Apparent density (g./cm³) was calculated from the dried weight (g./cm²) and thickness (g.) of a test piece.

Filling value (g./cigarette) was calculated from the stress measured on a test sample shredded into a width of 0.8 mm and put in a cylinder having a cross sectional area of 40 cm² and compressed at a rate of 0.6 mm/second.

Waterproof property (hours) was expressed as the time needed to brake of a test piece soaked in water at 25°C and in a dish and oscillated periodically until the test piece was broken.

The organoleptic properties shown in Table 3 were expressed by the number of persons who praised sample cigarettes in the sensory test (applying the pair test method). The test was performed by panel consisting of ten professional persons who considered smell, taste, mildness and physiological lightness of the cigarettes consisting of sheet-like materials produced by the present invention and by the conventional extrusion process, respectively.

TABLE 2

| Major raw material | Present Process Tobacco cells | Conventional process Tobacco powder |
|---|---|---|
| Additives | | |
| Carboxymethyl cellulose | | 5 % |
| Glyoxal | | 3 % |
| Physical properties | | |
| Thickness (mm) | 0.20 | 0.13 |
| Strength (g./mm²) | 300 | 154 |
| Elongation (%) | 5.4 | 1.0 |
| Apparent density (g./cm³) | 0.28 | 0.50 |
| Filling value (g./cigarette) | 0.9 | 1.2 |
| Water-proof property (hrs.) | above 50 | 0.5 |

TABLE 3

| | Major raw material | Flavour | Taste | Mildness | Physiological lightness |
|---|---|---|---|---|---|
| Present process | Tobacco cells | 4 | 4 | 10 | 10 |
| Conventional process | Tobacco powder | 6 | 6 | 0 | 0 |

The data in Table 2 show that the sheet-like material produced according to the invention is extremely excellent physical properties in strength, elongation, water-proof property and filling value, even though no carboxymethylcellulose as a binder and glyoxal as a water-proofing agent were added. Additionally, the data in Table 3 show that the cigarettes which consist of the sheet-like material produced according to the invention, are remarkably superior in mildness and physiological lightness, while being almost equivalent in flavor and taste, as compared with those obtained by the conventional process.

Figure 2:
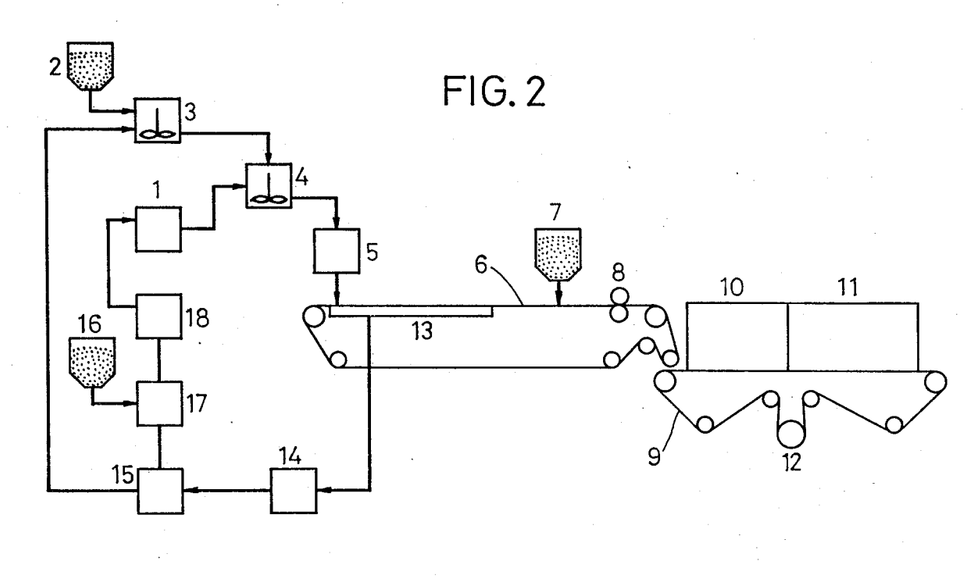
FIG. 2 is a schematic flowsheet illustrating the process for producing sheet-like material for smoking from tobacco cells propagated in the cultured broth.

FIG. 2 is a schematic flowsheet illustrating an embodiment of the steps for producing the sheet-like material of the present invention, where a portion of the cultured broth taken out from fermenter 1 is mixed with aqueous suspension 3 of fibrous materials and/or inorganic materials 2 in the mixing tank 4, and after being stirred gently and further passed through the reservoir 5, the resulting mixture is supplied onto a continuously travelling endless gauze 6 at a prescribed rate, so as to form a sheet-like cake having a suitable thickness on said endless gauze 6. Said cake is travelled together with the gauze 6 and after tobacco powder and/or supplementary agents 7 are spread thereon and the cake is pressed by rolls 8, it is stripped off by a doctor blade (not shown) so as to be transferred onto the continuously traveling endless felt 9, which passes through the pre-drying chamber 10 and the main drying chamber 11. The cake thus having been dried is stripped off by a doctor blade (not shown) to become a sheet-like material for smoking, while the endless felt 9 separated from the sheet-like material is dried on drum-dryer 12. The filtrate collected in sucking box 13 set under the endless gauze 6 is further separated from a small quantity of solid matter by the centrifuge 14 and stored transitorily in the tank 15, and is then returned to the initial fermenter 1 after being supplemented with fresh medium-constituents 16 at the tank 17 and sterilized by sterilizer 18. The solid matter separated from the liquid by the centrifuge 14 is returned to the mixing tank 4, while a portion of the stored filtrate in tank 15 is preferably returned into the the suspension 3 so as to improve suspension-abilities of the fibrous materials and/or inorganic materials.

According to another embodiment of the present invention, the tobacco cells obtained by the tissue-culture of plants of the genus Nicotiana are made into rod-like material for smoking.

In the specification of U.S. Pat. No. 3,223,090, it is disclosed that a mixture of tobacco powder, water and appropriate additives are cast into rod-shape and freeze-dried so as to form a rod-like material for smoking.

We have discovered that a rod-like material for smoking similar to that in the above U.S. Patent can be readily obtained using said tobacco cells. That is, fresh tobacco cells having specific properties of viscosity and, consequently, a rod-like material having excellent physical properties can be made by casting the mixture consisting of tobacco cells and appropriate additives into a rod-shape and thereafter freeze-drying the rod-shaped mixture.

According to the present invention, fresh tobacco cells separated from cultured broth are mixed with tobacco leaf substances and/or the fibrous materials and/or inorganic materials which do not damage the smoking characteristics of the final products therefrom, to form a paste with a moisture content of 80–93 percent. It is preferable to add a small amount of water to the above paste to adjust the moisture content of the paste, when the content of the tobacco cells in the paste is comparatively small. The paste thus formed can be readily cast into a rod-shape, and thereafter freeze-dried so as to be set in substantially the same form as when cast. On the contrary, a paste with moisture content of below 80 percent or above 93 percent is unsuitable for being physically cast into a rod-shape.

In the present invention, the supplementary agents such as the aromatics, sweetenings, hydroscopic agents and burning agents, which are used generally in the production of conventional re-constituted tobacco, may be added to the said mixture of tobacco cells with tobacco leaf substances and/or the fibrous materials and/or inorganic materials. However, the aromatics, sweetenings and hydroscopic agents among said supplementary agents may be later incorporated into the finished (freeze-dried) rod-like material in the invention. The kinds of fibrous materials and inorganic materials which do not damage the smoking characteristics of the final product and the supplementary agents which may be used in the present invention, are the same as described previously.

The tobacco leaf substances and/or the fibrous materials and/or inorganic materials to be mixed with the tobacco cells are effective the physical and organoleptic properties of the dried rod-like material, and particularly strength and filling value. The quantities of such additives are from 0.3- to 2.0-fold of the dried weight of the tobacco cells used. The quantities of the supplementary agents to be added are rather small, and therefore addition of these agents have little influence on the moisture content of the said paste.

Table 4 illustrates the relationship between the composition and moisture content of a paste consisting of tobacco cells with a moisture content of 93 percent and dried tobacco powder.

TABLE 4

| Composition (Dried weight %) | | Moisture content of paste (W.B.) |
|---|---|---|
| Tobacco cells | Tobacco powder | |
| 69 % | 31 % | 90.3 % |
| 51 " | 49 " | 87.5 " |
| 38 " | 62 " | 84.7 " |

In order to cast the above paste into a rod-shape, continuous cylindrical extrusion-machines are preferably used. However, the paste may be frozen as is in a cast having a rod-shape. Boring fine holes of from 0.2 mm to 0.5 mm diameter, lengthwise through the rod-shaped paste improves the draw resistance in smoking of the final product.

The paste, cast into rod-shape is then flash-frozen by placing the same in a zone at a temperature of from about −20° to −80° C, and is thereafter freeze-dried at a temperature of less than −5° C and at a pressure of less than 3 mmHg. If the paste is frozen slowly, large crystals of ice are formed in the frozen rod, and this is disadvantageous that the drying time is prolonged and the inner pores of the finished rod-like material become larger and less uniform.

In the above freeze-drying, the moisture (ice) of the frozen paste is removed by sublimation, and consequently the frozen paste is dried without any shrinkage, and the original shape and size are maintained. Since the fresh tobacco cells used as the raw material in the invention contain generally moisture of more than 90 percent (W.B.) inside the cell-membranes thereof, the freeze-dried rod-like material therefrom has innumerable fine pores and remarkably little apparent density. Further, as the fresh tobacco cells are cohesive and act as a binder in the paste, the tobacco leaf substances and other additives in the dried rod-like material are incorporated together strongly by the tobacco cells, while the rod acquires appropriate elasticity.

The rod-like material obtained above, after the moisture content is adjusted to 10–14 percent, and upon being encased as it is in a wrapper or further attached with filter tip at one end is ready for sale and smoking. This cigarette has mild and light organoleptic properties due to the low content of nicotine and tar, and has good burning-ability due to the many inner pores.

Table 5 shows examples of the equilibrium moisture content (W.B.) of the rod-like material made by freeze-drying a paste consisting of tobacco cells and tobacco powder, both derived from *N. tabacum* var. *bright yellow*. The equilibrium moisture content was measured on a sample placed in a sulfuric acid-desiccator at a temperature of 20° C the belowmentioned humidities. After attaining a constant moisture content, the samples were dried at a temperature of 100° C for 1 hour.

TABLE 5

| Composition (dried weight) | Tobacco cells 100 % | Tobacco cells 69 % Tobacco powder 31 % | Tobacco cells 51 % Tobacco powder 49 % | Tobacco powder 100 % |
|---|---|---|---|---|
| Relative humidity | | | | |
| 50 % | 13.0 % | 11.5 % | 10.8 % | 9.0 % |
| 60 " | 16.1 " | 14.7 " | 13.7 " | 11.5 " |
| 70 " | 21.0 " | 18.9 " | 18.0 " | 14.9 " |
| 80 " | 29.5 " | 27.1 " | 25.7 " | 21.8 " |

The following examples serve to illustrate the invention without however limiting it:

EXAMPLE 1

A seed of *N. tabacum* var. *bright yellow* was washed with deionized water, soaked in 95 percent ethanol for several seconds, further soaked in 10 percent sodium hypochlorite solution for about 10 minutes and thereafter washed with sterile water. Said seed was placed on a sterilized solid culture-medium, which is prepared by adding 1 percent of agar to the composition shown in Table 1 put in a cotton-plugged Erlenmeyer's flask, and incubated at a temperature of 26°–30 C for about 4 weeks. When a budding portion of the seed was brought in contact with the solid medium, callus was derived from that contact point. This callus was cut off, transferred onto a fresh medium having the same composition as the above, and cultured. After such a sub-culture of callus had been repeated thrice, about 3 g. of the callus by fresh weight formed in the last culturing were inoculated into 100 ml. of liquid medium of the same composition but without agar held in a 500 ml.-Sakaguchi's flask, and cultured on a shaker at a temperature of 28°–30° C. After about 2 weeks, tobacco cells were propagated in suspension in the liquid. About 10 ml. of this cultured broth were transferred into 100 ml. of fresh liquid medium of the same composition and shake-cultured again. After such a sub-culture had been repeated five times, cultured broth, where tobacco cells were more finely and uniformly dispersed, was obtained in about a week.

About 100 ml. of said cultured broth were then inoculated into 1 liter of liquid medium of the same composition held in a 3 liter-flask and shake-cultured for a week. The cultured broth obtained in the above 3 liter-flask was inoculated into 11 liters of liquid medium held in a 15 liter-jar-fermenter, and cultured at a temperature of 30° C, under an aeration rate of 7.5 liters/minute and an agitating rate of 50 r.p.m. After 5–6 days, about 5 liters, that is, about a half of the cultured broth in the jar-fermenter where tobacco cells had been propagated in suspension, were taken out and about 5.5 liters of fresh medium, which had been separately prepared and sterilized, were supplemented to the fermenter and aeration-culture with agitating was carried on under the same conditions as described above except that the aeration rate was increased to 11.5 liters/minute. After 2 days about 5 liters of cultured broth were similarly taken out of the fermenter and fresh medium was supplemented to the fermenter again. Thus, tobacco cells of 13–15 g. by dried weight per liter of the cultured broth were obtained every other day, by repeating the abovementioned semi-continuous culture of the tobacco cells.

10 liters of cultured broth containing 142 g. of the dried weight of tobacco cells prepared as described above were filtered by means of suction through a gauze of 100 mesh, so as to form a sheet-like cake on the gauze, the dried weight/m² of which was 80 g. three grams of sorbitol and a small quantity of cascarilla oil were made to stick on the cake by spreading the same and pressing such cake gently between rolls. The pressed cake was pre-dried by using a hot air stream at a temperature of 60° C to a moisture content of about 60 percent (W.B.), and then dried by using hot air stream at a temperature of 100° C to a moisture content below 10 percent. Thereafter, the moisture content of the dried sheet was adjusted to 12 percent (at a temperature of 20° C and a humidity of 60 percent).

The thus obtained sheet-like material had a strength of 300 g./mm², an apparent density of 0.28 g./cm³, a filling value of 0.89 g./cigarette, a water-proof property of at least 50 hours, and the cigarettes made by using this sheet were superior in mildness and physiological lightness.

EXAMPLE 2

Tobacco cells were propagated by a similar operation to that in Example 1 except that a fragment of a leaf of *N. tabacum* var. *xanthi* was used instead of a seed of *N. t.* var. *bright yellow*. Fifteen grams of wood pump (N-BKP) dispersed in a hundred-fold quantity of water were added to 10 liters of cultured broth (containing 145 g. of tobacco cells by dried weight), and the resulting mixed liquid was filtered by means of suction through a filter cloth, so as to form a sheet-like cake having a thickness corresponding to dried weight of 70 g./m². This cake was a dried by using a hot air stream at a temperature of 70° C to a moisture content below 10 percent. Two grams of sugar and a small quantity of benzoin tincture were sprinkled on the dried cake and simultaneously the moisture content of the cake was adjusted to 12 percent.

The thus obtained sheet had a strength of 450 g./mm², a water-proof property of at least 50 hours, a filling value of 0.70 g./cigarette, and the cigarettes made by using said sheet were superior in mildness and physiological lightness.

EXAMPLE 3

Tobacco cells were propagated by a similar operation to that in Example 1 except that a fragment of root of *N. glutinosa* was used instead of a seed of *N. t.* var. *bright yellow*. Ten liters of cultured broth (containing 142 g. of tobacco cells by dried weight), were mixed with 30 g. of vein of tobacco leaf which had been refined and dispersed in a 25-fold quantity of water. The mixed dispersion liquid was filtered and made into a sheet-like material in the same way as in Example 1, except that 4 g. of glycerin and a small quantity of bergamot oil were used as supplementary agents.

The thus obtained sheet had a strength of 400 g./mm², at least water-proof property of at least 50 hours, a filling value of 0.70 g./cigarette, and the cigarettes made therefrom were superior in mildness and physiological lightness, while being excellent in flavor and taste.

EXAMPLE 4

Tobacco cells were propagated in the same way as in Example 1 except that a fragment of the stem of *N. debneyi* was used instead of a seed of *N. t.* var. *bright yellow*. Ten liters of the cultured broth (containing 137 g. of tobacco cells by dried weight), were mixed with 15 g. of calcium carbonate and 10 g. of wood pulp which had been dispersed in a 50-fold quantity of water. The resulting dispersion liquid was filtrated and made into a sheet-like material in the same way as in Example 1 except that 3 g. of propyleneglycol and a small quantity of iris oil there used as supplementary agents.

The thus obtained sheet had a strength of 470 g./mm², an apparent density of 0.30 g./cm³, a filling value of 0.65 g./cigarette, a water proof property of at least 50 hours, and the cigarettes made therefrom were superior in mildness and physiological lightness.

EXAMPLE 5

Tobacco cells were progapated in the same way as in Example 1 except that a fragment of bud of tabacum var. nambu was used instead of a seed of *N. t.* var. *bright yellow*. 10 liters of the cultured broth (containing 141 g. of tobacco cells by dried weight) were mixed with 12 g. of glass fiber, and the resulting dispersion was filtered and made into a sheet-like material in the same way as in Example 1 except that 3 g. of sorbitol and a small quantity of tobacco extract were used as supplementary agents.

The thus obtained sheet had a strength of 420 g./mm², a water-proof property of at least 50 hours, a filling value of 0.68 g./cigarette, and the cigarettes made therefrom were superior in mildness and physiological lightness.

EXAMPLE 6

Tobacco cells were propagated in the same way as in Example 1 except that a fragment of a petal of *N. tabacum* var. *enshu* was used instead of a seed of *N. t.* var. *bright yellow* and that the filtrate of the cultured broth taken from the jar-fermenter was returned to the jar-fermenter after being supplemented with fresh medium-constituents and sterilized instead of the fresh medium which had been newly prepared and supplemented into the jar-fermenter. Ten liters of the cultured broth (containing 144 g. of tobacco cells by dried weight) were filtered in the same way as in Example 1, and 120 g. of tobacco powder, 3 g. of propyleneglycol and a small quantity of iris oil was made to stick on the cake by spreading the same and pressing the cake between rolls. The resulting cake was dried in the same way as in Example 2 and thereafter the moisture content thereof was adjusted to 13 percent.

The thus obtained sheet had a strength of 210 g./mm², a water proof property of at least 50 hours, a filling value of 0.95 g./cigarette, and the cigarettes made therefrom were superior in mildness and physiological lightness, while being excellent in flavor and taste.

EXAMPLE 7

Tobacco cells were propagated in the same way as in Example 1 and separated from the cultured broth by means of a centrifuge.

1.5 kg. of the tobacco cells by fresh weight (containing 103 g. by dried weight) collected from the above were mixed and kneaded with 100 g. of particles having a size corresponding to meshes of 16–32 prepared by drying and grinding shredded tobacco obtained from cigarettes marketed under the trademark "hi-lite," 10 g. of sorbitol and a small quantity of cascarilla oil, so as to form a paste with a moisture content of 87 percent (W.B.). The paste was cast using a cylindrical extrusion-machine into a rod-shape having a diameter of 8 mm and a length of 63 mm, while simultaneously boring the rod with four fine holes with a diameter of 0.5 mm lengthwise, by using thin wire cores. The rod-shaped paste was flash-frozen by placing the same in a zone at a temperature of −20° C. Thereafter the frozen rod was freeze-dried by means of a vacuum freeze-drier at a pressure of 2.5 mmHg and a temperature of −7.2° C. The dried rod-like material had innumerable fine pores inside. After the moisture content of this rod had been adjusted to 13 percent, said rod was encased in a wrapper together with a filter tip of length having a 17 mm attached to one end of the rod, and submitted to physical property- and smoking-tests to compare the properties with those of the goods on the market (trademark "hi-lite"). The results are shown in Table 6.

Table 6

|  | Products of the invention | Goods on the market (hi-lite) |
|---|---|---|
| Filling value (g./cigarette) | 0.47 | 0.85 |
| Hardness (kg./cigarette) | 1.50 | 0.87 |
| Nicotine in smoke (mg./cigarette) | 0.3 | 1.7 |
| TPM in smoke ( " ) | 9.0 | 27.9 |
| Draw resistance in smoking (mmH$_2$O) | 115 | 108 |

Each test item in the Table 6 was measured in the following way:

Filling value was measured in the same way as described previously.

Hardness was expressed as stress caused by pressing the test cigarette in its diameter-direction until distortion of 1.5 mm occurred.

TPM in smoke (Total Particulate Matter in smoke) was expressed as the weight increase of an aerosol filter (Glass Fiber Sheet CM 113A, made by Cambridge Filter Co., Ltd.) caused by adhesion of crude tar (moist tar) on the filter, when smoke of the test cigarette was drawn through said filter.

Nicotine in smoke was calculated from the wave length of ultraviolet absorption of an aqueous solution which had been prepared as follows crude tar adhered onto the aerosol filter in the abovementioned measuring of TPM in smoke was steam-distillated in acidic condition, and then the residue thereof was steam-distillated again but in alkaline condition, and thereafter the distillate was acidified.

Draw resistance of the rod in smoking was expressed as the pressure difference indicated by a U-tube manometer filled with water when an air stream was drawn at a rate of 17.5 ml./second by means of a vacuum pump through the test cigarette and the U-tube manometer in parallel, under a temperature of 20° C and a relative humidity of 60 percent.

As seen from the results of Table 6, the rod-like material produced in the present invention is superior in filling value, quantities of nicotine and TPM in smoke as compared with the goods on the market, while being slightly higher in draw resistance.

EXAMPLE 8

Tobacco cells were propagated and collected in the same way as in Example 7 except that a fragment of a leaf of *N. t.* var. *xanthi* was used instead of a seed of *N. t.* var. *bright yellow*. 1.5 kg. of the tobacco cells by fresh weight (containing 105 g. by dried weight) collected were mixed and kneaded with 75 g. of particles having a size corresponding to meshes of 16–32 prepared by drying and grinding shredded tobacco from cigarettes marketed under the trademark "RAN", 75 g. of calcium carbonate, 5 g. of sugar and a small quantity of water, so as to form a paste with a moisture content of 85 percent (W.B.). The paste was filled into a pipe having a diameter of 8 mm and a length of 63 mm, while simultaneously boring the paste with four fine holes, each with a diameter of 0.5 mm, by passing thin wire cores into the pipe. The paste was flash-frozen as is by placing the same in a zone at a temperature of −20° C. The frozen rod was then freeze-dried by means of a vacuum freeze-drier at a pressure of 3 mmHg and at a temperature of −5° C. A small quantity of iris oil was incorporated into the dried rod-like material, and simultaneously the moisture content of the rod was adjusted to 11 percent. The rod was then encased with a wrapper in the same way as in Example 7. This cigarette was submitted to physical property- and smoking to compare its properties with those of the goods on. The market (trademark "RAN"). The results are shown in Table 7.

TABLE 7

|  | Products of the invention | Goods on the market (RAN) |
|---|---|---|
| Filling value (g./cigarette) | 0.58 | 0.93 |
| Nicotine in smoke (mg./cigarette) | 0.4 | 1.11 |
| TPM in smoke (mg./cigarette) | 5.1 | 18.8 |
| Draw resistance in smoking (mmH$_2$O) | 110 | 109 |

EXAMPLE 9

Tobacco cells were propagated and collected in the same way as in Example 7 except that a fragment of a root of *N. glutinosa* was used instead of a seed of *N. t.* var. *bright yellow*. 1.5 kg. of the tobacco cells by fresh weight (containing 102 g. by dried weight) collected were mixed and kneaded with 100 g. of particles having a size corresponding to meshes of 16–32 prepared by drying and grinding shredded tobacco from cigarettes marketed under the trademark "Winston", 10 g. of wood pulp (N-BKP) and a small quantity of tobacco extract, so as to form a paste with a moisture content of 86 percent (W.B.). The paste was thereafter cast into rod-like material for smoking in the same way as in Example 7.

EXAMPLE 10

The tobacco cells were propagated and collected in the same way as in Example 7 except that a fragment of a stem of *N. debneyi* was used instead of a seed of *N. t.* var. *bright yellow*. 1.5 kg. of tobacco cells by fresh weight (containing 104 g. by dried weight) were mixed and kneaded with 100 g. of particles having a size corresponding to meshes of 16–32 prepared by drying and grinding shredded tobacco from cigarettes marketed under the trademark "LARK," 10 g. of propyleneglycol and a small quantity of benzoin tincture, so as to form a paste containing a moisture content of 87 percent (W.B.). The paste was thereafter cast into rod-like material for smoking in the same way as in Example 7.

EXAMPLE 11

Tobacco cells were propagated and collected in the same way as in Example 7 except that a fragment of a bud of *N. tabacum* var. *nambu* was used instead of a seed of *N. t.* var. *bright yellow*. 1.5 kg. of tobacco cells by fresh weight (containing 106 g. by dried weight) were mixed and kneaded with 100 g. of particles having a size corresponding to meshes of 16–32 prepared by drying and grinding shredded tobacco from the cigarettes marketed under the trademark "ROTHMANS," 5 g. of active carbon and a small quantity of menthol, so as to form a paste with a moisture content of 88 percent (W.B.). The paste was thereafter cast into rod-like material for smoking in the same way as in Example 7.

EXAMPLE 12

Tobacco cells were propagated in the same way as in Example 6. 1.5 kg. of tobacco cells by fresh weight (containing 101 g. by dried weight) collected were thereafter treated in the same way as in Example 7, and rod-like material for smoking was obtained.

What we claim is:

1. A process for producing sheet-like material for smoking, which comprises:
   1. culturing a fragment of a plant body of the genus Nicotiana on a solid agar medium for plant tissue-culture and further comprising a mixture of growth-promoting agents selected from the group consisting of saccharides, inorganic salts, auxins, cytokinins and vitamins, to derive an amorphous lump of cells, designated as callus, on said solid medium,
   2. inoculating said callus into a liquid medium of the same composition as described above, and culturing the same under aerobic conditions, so as to propagate it into a state of tobacco cells suspended in the liquid,
   3. filtering the cultured liquid containing the tobacco cells through a gauze of 50–120 meshes or filter cloth, so as to form a sheet-like cake having a thickness corresponding to a dried weight above 50 g./m$^2$, and
   4. drying the sheet-like cake.

2. The process described in claim 1, where the cultured liquid is filtered so as to form a sheet-like cake, after said liquid has previously been mixed with at least one member selected from the group consisting of fibrous materials and inorganic materials, said fibrous materials and inorganic materials not damaging the smoking characteristics of the final product thereof.

3. The process described in claim 1, where the sheet-like cake is dried, after at least one member selected from the group consisting of tobacco leaf substances and supplementary agents has previously been made to stick on the sheet-like cake.

4. The process described in claim 2, where the fibrous material is a fiber selected from the group consisting of wood pulp, hemp, bagasse, beet, carbon fiber, and tobacco vein.

5. The process described in claim 2, where the inorganic material is silica, alumina, asbestos, kieselguhr, zeolite, talc or calcium carbonate.

6. The process described in claim 3, where the supplementary agent is at least one member selected from the group consisting of aromatics, burning agents, sweetenings and hydroscopic agents.

7. The process described in claim 2, where at least one member selected from the group consisting of fibrous materials and inorganic materials is used in an amount below 30 percent based on the dried weight of the tobacco cells contained in the sheet-like cake.

8. The process described in claim 3, where the tobacco leaf substances are used in a quantity below the value of the dried weight of the tobacco cells contained in the cake.

9. The process described in claim 1, where the sheet-like cake is dried at a temperature below 80° C.

10. The process described in claim 1, where the sheet-like cake is pre-dried at a temperature below 80° C, and is thereafter dried at a temperature of 100°–170 °C.

11. The process described in claim 1, where at least one member selected from the group consisting of aromatics, sweetenings and hydroscopic agents is sprinkled onto the dried sheet-like cake.

12. The process described in claim 1, where the inorganic phosphate in the medium for plant tissue-culture is used in a quantity from twice to thrice as much as that in the conventional Linsmaier and Skoog's medium.

13. A process for producing rod-like material for smoking which comprises:
    1. culturing a fragment of a plant body of the genus Nicotiana on a solid agar medium for plant tissue-culture and further comprising a mixture of growth-promoting agents selected from the group consisting of saccharides, inorganic salts, auxins, cytokinins and vitamins, to derive an amorphous lump of cells, designated as callus, on said solid medium,
    2. inoculating said callus into a liquid medium of the same composition as described above, and culturing the same under aerobic conditions, so as to propagate it into a state of tobacco cells suspended in the liquid,
    3. separating the tobacco cells from the cultured liquid,
    4. mixing the tobacco cells with at least one member selected from the group consisting of tobacco leaf substances, fibrous materials and inorganic materials, to form a paste with a moisture content of 80–93 percent, said fibrous materials and inorganic materials not damaging the smoking characteristics of the final product thereof,
    5. casting the past into rod-shape, and
    6. freeze-drying said rod-shaped paste.

14. The process described in claim 13, where the paste is cast into a rod-shape, said paste having previously been mixed with supplementary agents.

15. The process described in claim 13, where the fibrous material is a fiber selected from the group consisting of wood pulp, hemp, bagasse, carbon fiber and beet.

16. The process described in claim 13, where the inorganic material is silica, alumina, asbestos, kieselguhr, zeolite, talc or calcium carbonate.

17. The process described in claim 14, where the supplementary agent is at least one member selected from the group consisting of sweetenings, hydroscopic agents, burning agents and aromatics.

18. The process described in claim 13, where at least one member selected from the group consisting of tobacco leaf substances, fibrous materials and inorganic materials is used in an amount from 0.3- to 2.0-fold of the dried weight of the tobacco cells used.

19. The process described in claim 13, where at least one member selected from the group consisting of aromatics, sweetenings and hydroscopic agents is sprinkled onto the dried rod-like material.

20. The process described in claim 13, where the inorganic phosphate in the medium for plant tissue-culture is used in a quantity from twice to thrice as much as that in the conventional Linsmaier and Skoog's medium.

* * * * *